United States Patent [19]

Walker et al.

[11] 4,274,042
[45] Jun. 16, 1981

[54] AC MOTOR DRIVE SYSTEM HAVING CLAMPED COMMAND ERROR SIGNAL

[75] Inventors: Loren H. Walker, Salem; John H. Cutler, Roanoke, both of Va.

[73] Assignee: General Electric Company, Salem, Va.

[21] Appl. No.: 32,893

[22] Filed: Apr. 24, 1979

[51] Int. Cl.³ .......................... H02P 5/34; H02P 7/42; H02P 5/28; H02P 7/36
[52] U.S. Cl. ................................... 318/803; 318/798; 318/812
[58] Field of Search ............................... 318/798–805, 318/812, 813–817, 434

[56] References Cited

U.S. PATENT DOCUMENTS

| | | | |
|---|---|---|---|
| 3,805,135 | 4/1974 | Blaschke | 318/803 |
| 3,919,609 | 11/1975 | Klautschek et al. | 318/803 |
| 4,137,489 | 1/1979 | Lipo | 318/798 |
| 4,186,334 | 1/1980 | Hirata | 318/805 |

Primary Examiner—S. J. Witkowski
Assistant Examiner—John B. Conklin
Attorney, Agent, or Firm—Arnold E. Renner

[57] ABSTRACT

Disclosed is a three phase AC motor drive system wherein a variable frequency variable magnitude AC current is fed to an AC motor load from a thyristor controlled DC to AC inverter which is supplied from a thyristor controlled AC to DC converter by way of a DC link including an inductor. The DC load current is commanded to rise at a rate limited by the difference between the output voltage of the converter and the input voltage to the inverter which voltage appears across the inductor. As a result of the inherent commutation transport lag encountered for commands in the negative direction, an error signal clamp is placed in a feedback signal path controlling the AC to DC converter for limiting the command for changes in the positive direction thereby providing a system response in the positive direction which is more nearly like the response in the negative direction.

14 Claims, 9 Drawing Figures

AC MOTOR DRIVE SYSTEM HAVING CLAMPED COMMAND ERROR SIGNAL

CROSS REFERENCE TO RELATED APPLICATIONS

The subject invention is related to the following related applications which are also assigned to the assignee of this invention;

U.S. Pat. No. 4,156,896 entitled, "Method of Controlling a Power Conversion System", issued May 29, 1979, in the name of Herbert W. Weiss;

U.S. Pat. No. 4,164,015 entitled, "Control Circuit for Power Converter", issued Aug. 7, 1979, in the names of Paul M. Espelage, et al.; and U.S. Pat. No. 4,230,797 entitled, "Controlled Current Inverter and Motor Control System", issued Oct. 28, 1980, in the names of Paul M. Espelage, et al.; and U.S. Pat. application Ser. No. 32,937 entitled, "Dual Mode AC Motor Drive System", filed on even date herewith, in the names of Loren H. Walker, et al.

BACKGROUND OF THE INVENTION

This invention relates generally to power conversion systems and more particularly to a system for controlling an AC motor by controlling the motor current via a three phase converter-inverter system.

While DC motors historically have had widespread use where operation over a wide speed range is desired, more recently AC motors have been finding greater application in variable speed drive applications. There are, however, certain problems associated with the use of AC motors particularly where the motor is supplied with power from a system comprising an AC to DC converter feeding a variable frequency DC to AC inverter such as a phase controlled thyristor inverter. As disclosed, for example, in the above referenced U.S. Pat. Nos. 4,156,896 and 4,164,015, if one is operating a phase controlled thyristor AC to DC converter in a negative region (fourth quadrant) and a positive command voltage is suddenly applied, the output can move into the positive region (first quadrant) relatively quickly. However, if one is operating in the positive region and a reverse command voltage is applied, transition to the negative region cannot take place as rapidly due to the inherent transport lag or delay time encountered in commutation. Thus, in systems where the DC voltage is required to change rapidly in positive and negative directions, response to forward and reverse command signals will not be the same due to the inherent unequal bidirectional operating characteristic encountered with phase controlled thyristor bridge converters.

SUMMARY OF THE INVENTION

It is an object of the present invention, therefore, to provide an improved power conversion system particularly as applied to the operation of an active load; e.g., an AC motor.

Another object is to provide a variable frequency AC motor drive system which is adapted to have like response for operational commands in either the forward or reverse direction.

It is a further object of the present invention to provide a current control system which responds very rapidly with minimum overshoot.

The foregoing and other objects are satisfied in accordance with the present invention through the provision of a method and apparatus for controlling the current supplied to an active load, the load more particularly comprising a circuit including an AC induction motor, and drive means for providing an AC current of variable magnitude and frequency to the motor. A variable DC power source, namely a three phase converter is connected from a main three phase AC source to a variable frequency AC power source, namely a three phase inverter, preferably by way of a DC link comprising an inductor. Control of the converter is provided in accordance with a composite error signal resulting from the summation of first and second error signals generated in respective feedback signal paths. The first error signal comprises a positive feedback voltage corresponding to the motor back EMF which is reflected as a DC voltage at the inverter side of the inductor. The second error signal comprises a motor current error signal whose signal level is clamped at a predetermined amplitude preferably one which is fixed in value. The second error signal is developed by another summing junction having applied thereto signals corresponding to the torque command signal and a signal corresponding to the absolute magnitude of the motor current which are summed to develop the second error which is applied to the input of a voltage clamp whose output in turn is coupled to the first mentioned summing junction. The voltage clamp acts to limit the amplitude of the second error signal, preferably in one (positive) polarity direction, and has the effect of limiting the rate of change of current fed to the motor in the increasing current direction to resemble that which occurs inherently for command inputs to the opposite direction.

BRIEF DESCRIPTION OF THE DRAWINGS

While the present invention is particularly defined in the claims annexed to and forming a part of this specification, a better understanding can be had from the following description taken in conjunction with the accompanying drawings in which:

DETAILED DESCRIPTION

Figure 1:
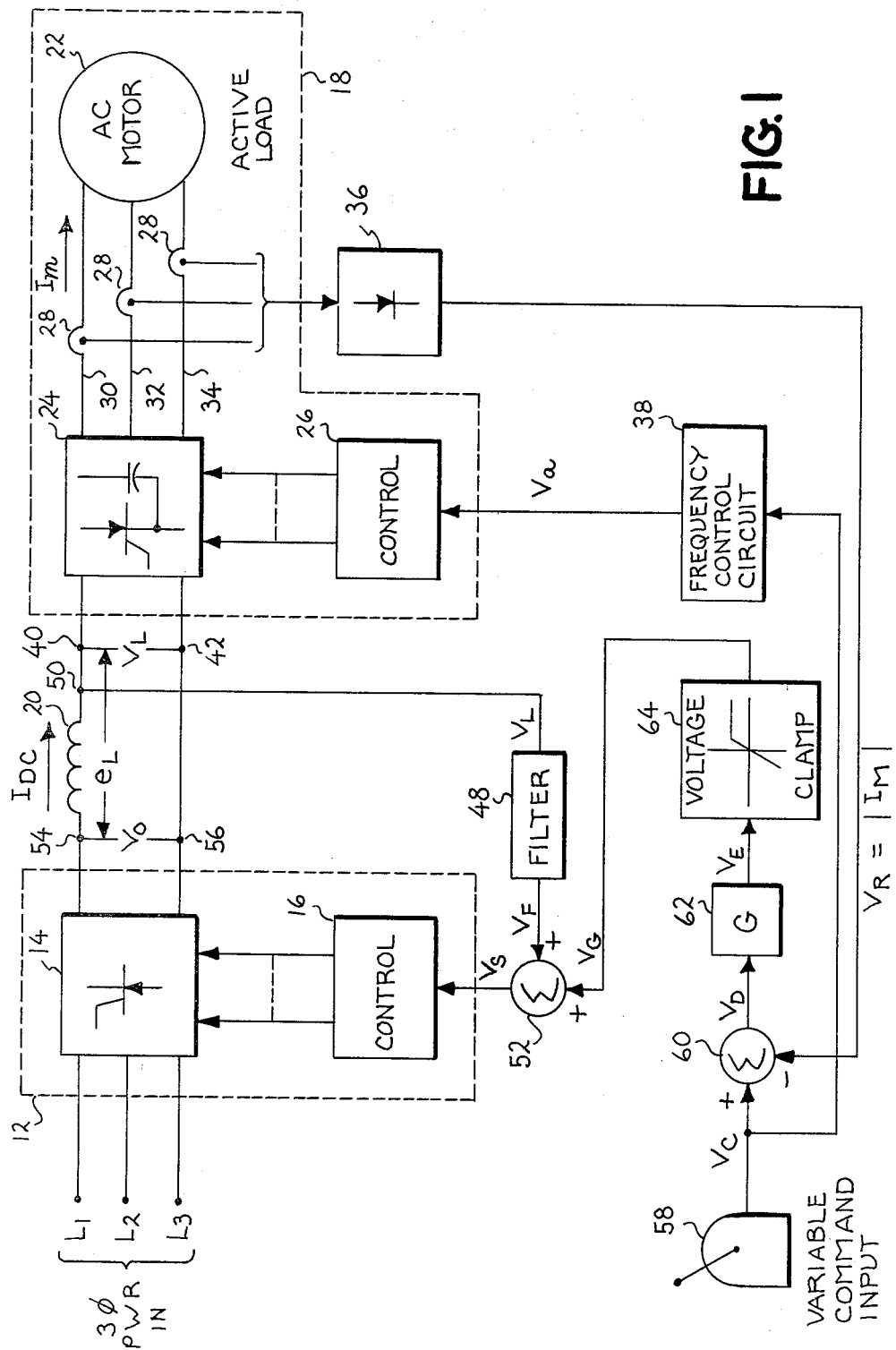
FIG. 1 is a schematic block diagram illustrative of the preferred embodiment of the subject invention in its broadest aspect.

Referring now to the drawings and more particularly to FIG. 1, reference numeral 12 denotes a source of variable DC current consisting of a three phase AC to DC converter 14 connected to a main source of three phase (3φ) electrical power supplied via lines $L_1$, $L_2$ and $L_3$. The converter is implemented, for example, by means of a controlled thyristor bridge, a typical example of which is shown in the above mentioned related U.S. Pat. No. 4,156,896. The converter 14 is controlled by a control circuit 16 which, for an AC to DC bridge converter, is adapted to generate and apply suitable gating signals thereto for rendering each thyristor conductive in a predetermined sequence. The converter 14 is adapted to supply a DC current $I_{DC}$ to an active load 18 by means of an inductor 20. The active load 18 in the present invention comprises an AC induction motor 22 driven in accordance with the output of a force commutated DC to AC inverter 24, also implemented by way of a thyristor bridge network, the details of which are not shown. The inverter is operated in accordance with gating signals generated and applied thereto from a firing control circuit 26. The apparatus considered up to this point is known and disclosed, for example, in the above mentioned U.S. Pat. No. 4,230,979, which disclosure is specifically incorporated hereinto by reference.

Additionally, the disclosure referenced in U.S. Pat. No. 4,230,979 also teaches that, among other things, current sensors 28 are associated with the three phase lines 30, 32 and 34 connecting the AC output from the inverter 24 to the motor 22. By coupling each of the three current sensors 30, 32 and 34 to a three phase rectifier circuit 36, an output signal $V_R$ proportional to the absolute value of motor current $|I_m|$ is provided. As taught in U.S. Pat. No. 4,230,979, the inverter 24 operates in response to a control signal $V_a$ applied to circuit 26 to supply motor current $I_m$ of variable magnitude and frequency. The operating frequency of the inverter 24, moreover, is under the control of the firing control circuit 26 which typically includes a voltage controlled oscillator feeding a ring counter, not shown.

The control signal $V_a$ is generated by a frequency control circuit 38 and for purposes of illustration is of the type which is power adapted to control motor slip, motor power factor, or some other parameter as a function of the torque command signal $V_c$. The above-referenced specification of U.S. Pat. No. 4,230,979 specifically details typical circuit means for implementing constant angle θ operation. Suffice it to say for purposes of this disclosure that frequency is controlled so that the current $I_m$ will produce motor torque of the desired direction. Additional details of the frequency control circuit are unnecessary to the explanation of the subject invention, since the inventive concept is directed more particularly to the control of the AC to DC converter 14 as it relates to supplying the current $I_{DC}$ to the DC to AC inverter 24 feeding the motor 22.

Figure 2A:
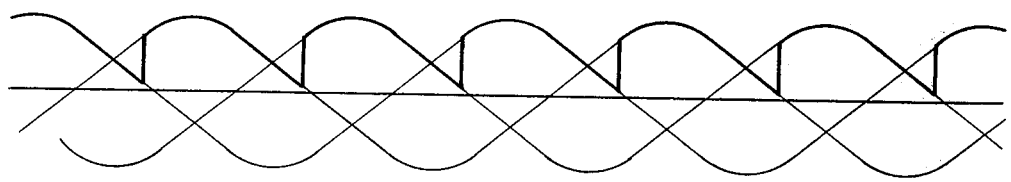
FIGS. 2A and 2B are a set of waveforms respectively illustrative of positive region (first quadrant) steady state operation of a three phase thyristor controlled AC to DC converter and a transition of such a converter from positive region to negative region (fourth quadrant) operation and being illustrative of the transport lag or delay time existing during the voltage reversal in making a transition from first to fourth quadrant operation.
Figure 2B:
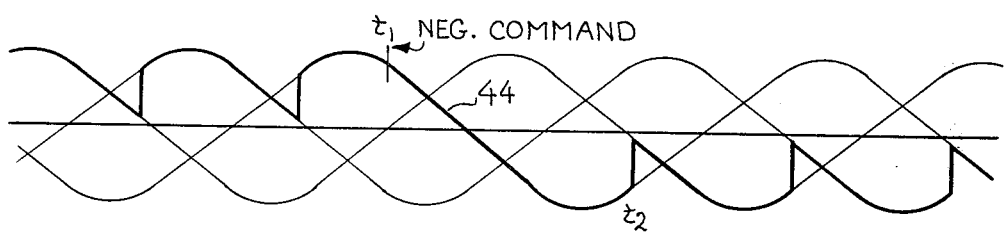
Figure 3A:
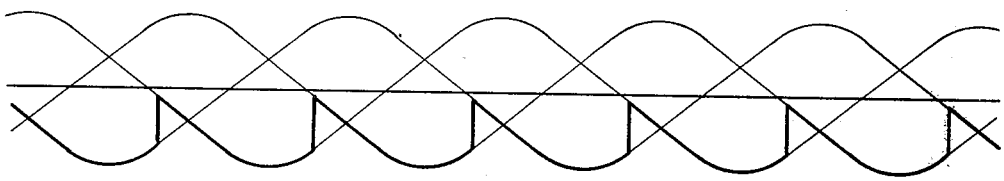
FIGS. 3A and 3B are waveforms respectively illustrative of steady state operation in the negative region (fourth quadrant) and a transition from a negative region (fourth quadrant) operation to a positive region (first quadrant) operation and further illustrative of the relatively rapid transition from fourth quadrant to first quadrant operation of a three phase thyristor controlled AC to DC converter.
Figure 3B:
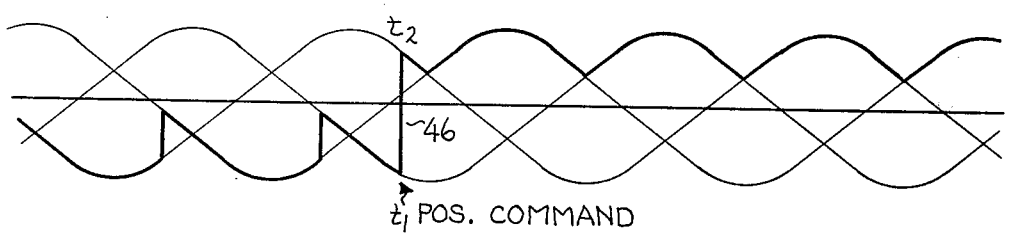

Since in a system of the type disclosed the voltage $V_L$, which is defined as the load voltage, appears across the input terminals 40 and 42 of the inverter 24, is adapted to swing positive or negative, the converter circuit 14 must operate in both the positive and negative regions of output DC voltage and accordingly, must be operative for first and fourth quadrant operation. Reference is now made to FIGS. 2A, 2B, 3A and 3B inasmuch as they depict the problem to which the present invention addresses itself. The waveforms of FIGS. 2A and 3A respectively illustrate steady state first and fourth quadrant operation of a thyristor controlled AC to DC bridge converter as taught, for example, in the above referenced U.S. Pat. Nos. 4,156,896 and 4,164,015, which teachings are also incorporated herein by reference. What is significant in regard to this invention about this type of converter operation is the difference in the transient response encountered in going from plus (+) to minus (−) (first to fourth quadrant) operation and going from minus (−) to plus (+) (fourth to first quadrant) operation. FIG. 2B is illustrative of converter operation in going from first to fourth quadrant operation upon the receipt of a negative command voltage at the time $t_1$. As indicated by the wave segment 44, an instantaneous transition cannot be made, but must follow the waveform of the AC wave being rectified to the time $t_2$ before commutation takes place, thereby having an inherently limited slew rate. Conversely where the system is operating in the negative or fourth quadrant and a positive command is received, a transient response $t_1$ to $t_2$ such as shown in FIG. 3B results. Waveform segment 46 indicates that a relatively rapid transition takes place. Accordingly, the waveforms in FIGS. 2B and 3B indicate that an unsymmetrical transient response normally occurs.

Turning attention again to FIG. 1, a first or coarse feedback signal path carrying a signal $V_F$, developed from the load voltage $V_L$, is provided by way of a filter 48 coupled from circuit junction 50 to a first summing junction 52. The filter comprises a substantially unity gain circuit such that the feedback signal $V_F$ comprises a positive feedback of unity gain, which in the absence of any other input to the summing junction 52, will cause the converter output voltage $V_O$ appearing across terminals 54 and 56 of the converter 14 to match the voltage $V_L$. With no DC voltage $e_L$ across the inductor 20, the inductor will tend to maintain a constant current at any voltage level $V_L$. If, however, a second feedback signal $V_G$ is applied in an additive sense to the summing junction 52, the result will be a rate of change of current $di/dt$ of $I_{DC}$ in the inductor 20 which is proportional to the second signal applied. It is to this second signal $V_G$ that the present invention is primarily directed. Accordingly, the present invention contemplates a second or trim feedback signal path which includes a clamping or limiting of the positive going portion of any second feedback signal applied to summing junction 52.

The second feedback signal comprises a difference signal derived from an operator controlled rheostat 58 and the motor current rectifier 36. In a simple system, for example, rheostat 58 is adapted to provide a variable command input signal proportional to a desired motor current $I_m$ which is substantially proportional to output torque. Accordingly, a current command signal $V_C$ is applied to one input of a second summing junction 60 whose other input comprises the signal $V_R$ which corresponds to the absolute value of the motor current $|I_m|$. The $|I_m|$ signal is indicative of actual motor torque, since motor torque is a function of both motor current, motor power factor, and gap flux. The two signals $V_C$ and $V_R$ are applied to the summing point 60 and combined, i.e. are subtracted from the other, and the difference signal $V_D$ is fed to a suitable operational amplifier 62, having an appropriate transfer function G. The output of the amplifier 62, accordingly, constitutes a current error signal $V_E$, which signal is a signal proportional to a desired change in motor current $I_m$. The gain of amplifier 62 is made sufficiently high in order to provide for precise control of current in the steady state. What is significant, however, is that the signal $V_E$ in the present invention is limited, i.e. clamped to a selected reference level in the positive direction by being coupled to a voltage clamp circuit 64 which provides an output $V_G$. The effect of the voltage clamp 64, as the waveforms in FIGS. 4A-4D illustrate, is to limit the change (di/dt) of current $I_{DC}$ and accordingly $I_m$ with respect to time for any positive going command voltage as reflected in the error signal $V_G$.

That this is true can be shown by the following discussion. For purposes of this discussion, the small resistance of the inductor 20 will be considered to be negligible. From the well known expression $e = L\, di/dt$ it should be noted that the voltage $e_L$ across the inductor 20 is equal to the value of the inductance L times the rate of change of current with respect to time (di/dt). Accordingly, the rate of change of current (di/dt) of $I_{DC}$ is proportional to $e_L = V_O - V_L$. Considering the apparatus shown in FIG. 1 and assuming that the combination of the filter 48 and the circuit configuration 12 exhibits a unity gain signal transfer characteristic; i.e., the voltage gain of the means 12 is K and the gain of the filter 48 is 1/K then for the control loop $V_O = K(V_S) = K(V_F + V_G)$, where $V_F$ and $V_G$ are the two error signals. Noting the voltage $e_L$ across the inductor 20 is equal to $V_O - V_L$ which in turn is equal to $K(V_S - V_F)$, from the expression $V_S = V_F + V_G$ the voltage $V_G$ reflects the scaled voltage $e_L$ across the inductor 20. Thus by limiting the voltage $V_G$, the voltage $e_L$ across the inductor is limited and accordingly the change of current di/dt of $I_{DC}$ and $I_m$ is also limited.

Figure 4A:
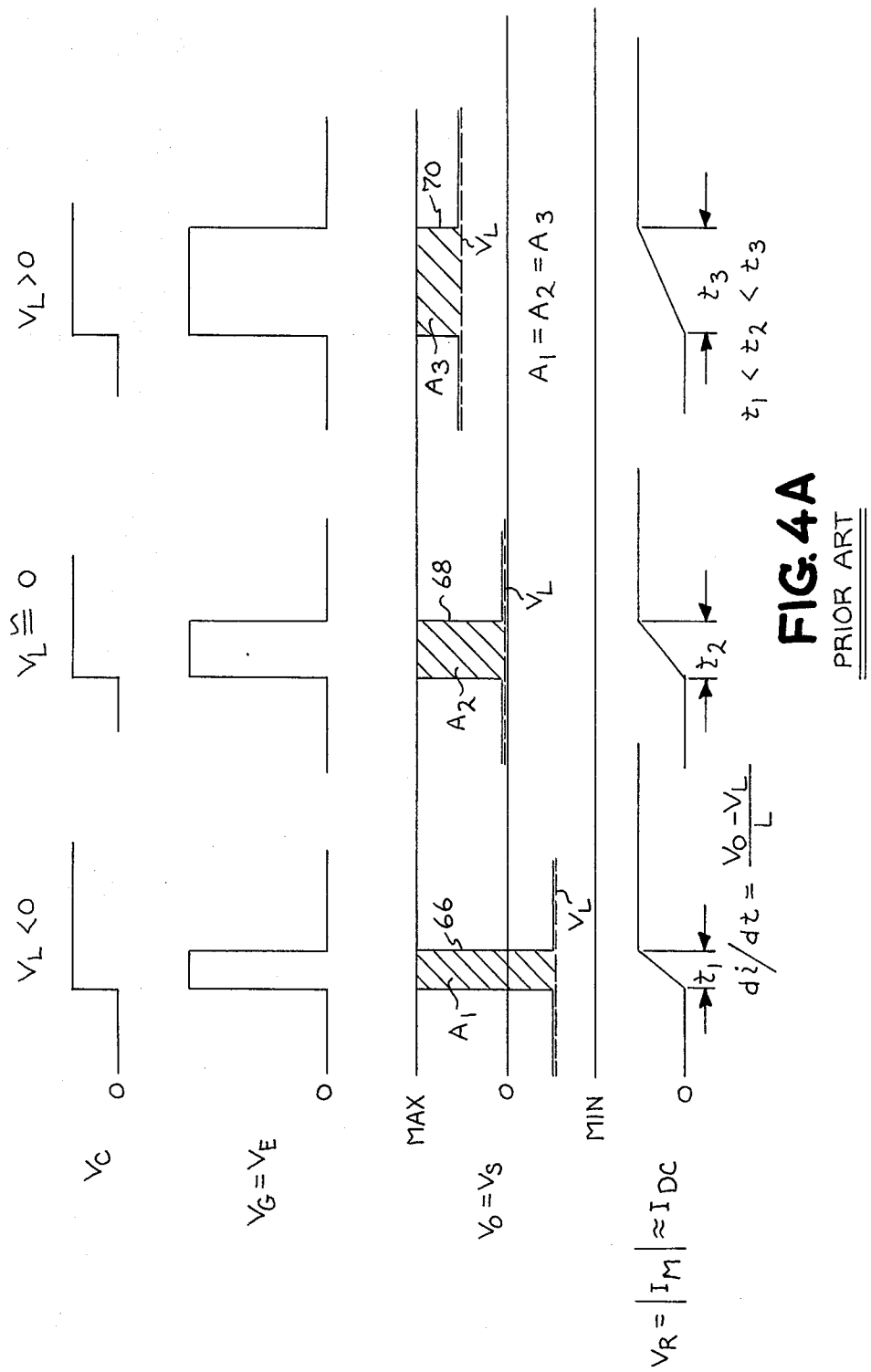
FIGS. 4A–4D are four sets of waveforms helpful in understanding the operation of the subject invention.

Referring now to FIGS. 4A through 4D, there are shown four sets of waveforms which are intended to illustrate the operating characteristics of a system of the type described. For clarity the scaling factor K introduced above is set equal to one in FIGS. 4A-4D. Under the condition where there is no limiting or clamping of the error signal, i.e. $V_G = V_E = G(V_C - V_R)$ and the gain G is very high. Considering first FIG. 4A, there are shown the corresponding waveforms for the current command signal $V_C$, the error signal $V_G$, the converter output signal $V_O$ and the motor current $I_{DC}$ for three values of load voltage $V_L$, namely where $V_L < 0$, $V_L \approx 0$ and $V_L > 0$. FIG. 4A is intended to represent an idealized system where there are no time delays or rate limits except for the effect of the inductor 20 on the current $I_{DC}$. From the expression $e = L\, di/dt$, one can also derive the expression $\Delta I = \int (e/L) dt = 1/L \int e\, dt$. From the latter expression, FIG. 4A is intended to illustrate that for a given change in current $\Delta I$, the volt second interval ($\int e\, dt$) or area under the waveforms 66, 68 and 70 will remain the same. Accordingly, as the load voltage $V_L$ ranges from less than zero potential to greater than zero potential, the time intervals $t_1$, $t_2$ and $t_3$ increase in length, meaning that the current response is not constant, but is a function of the load voltage.

Figure 4B:
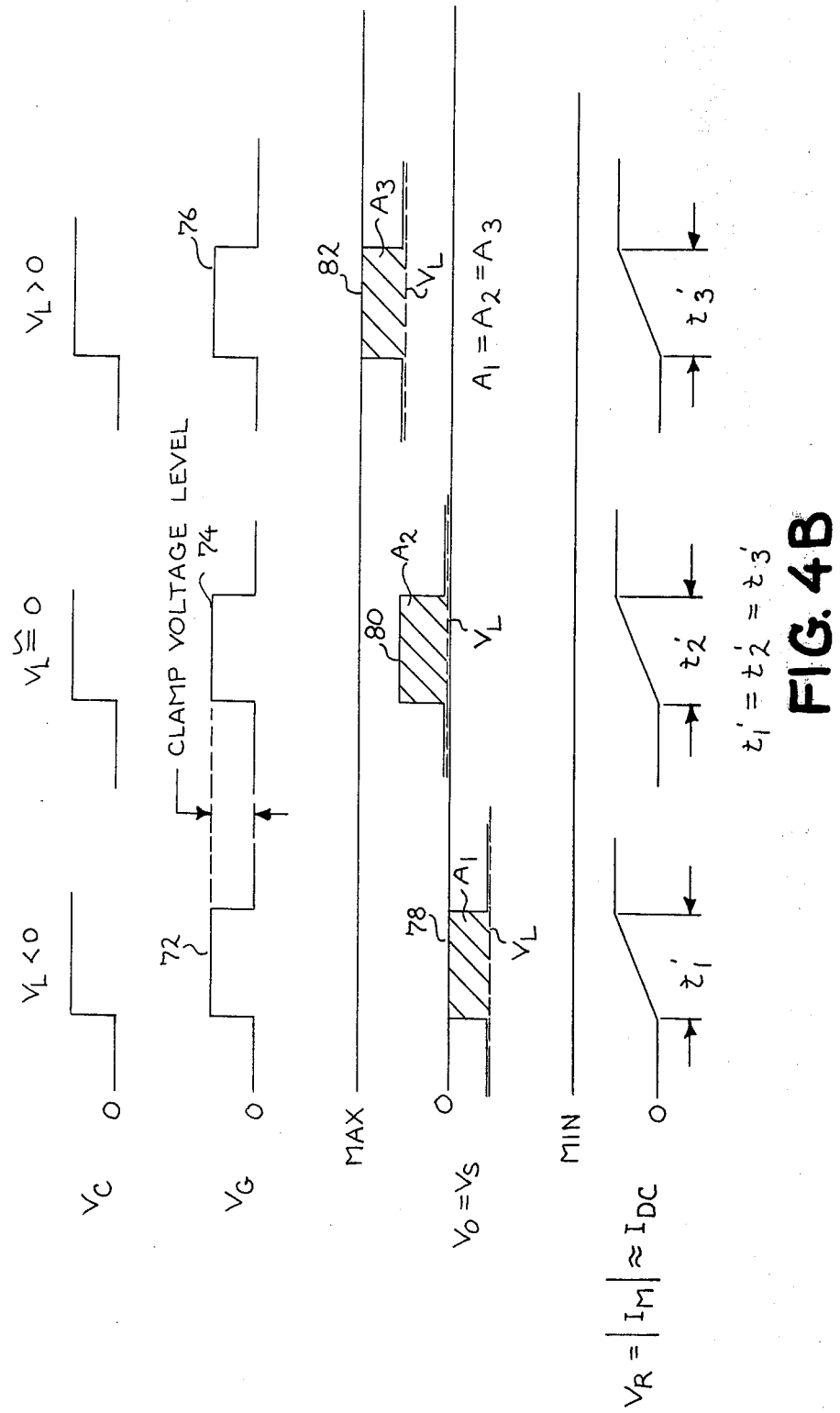
Figure 4C:
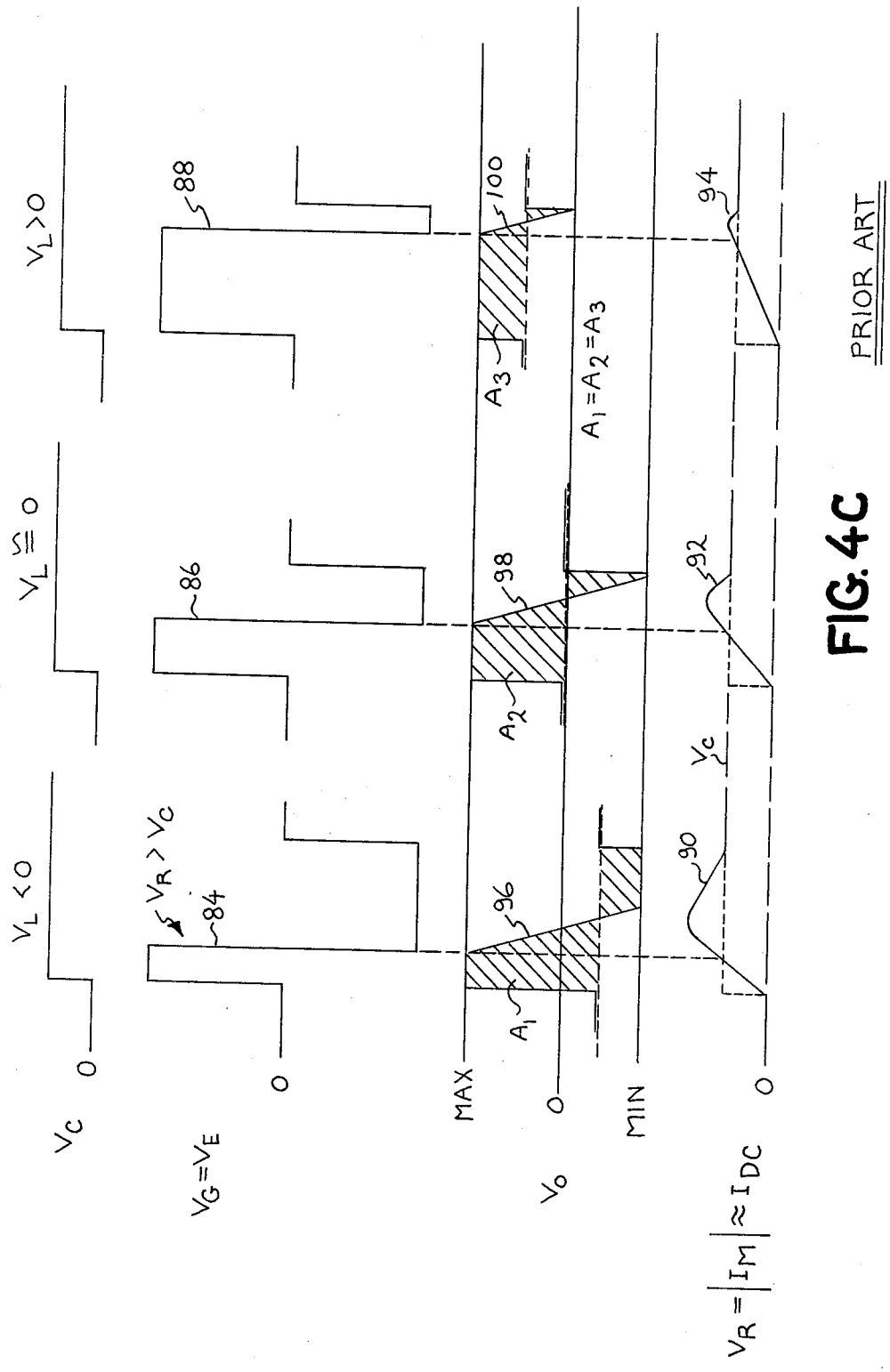
Figure 4D:
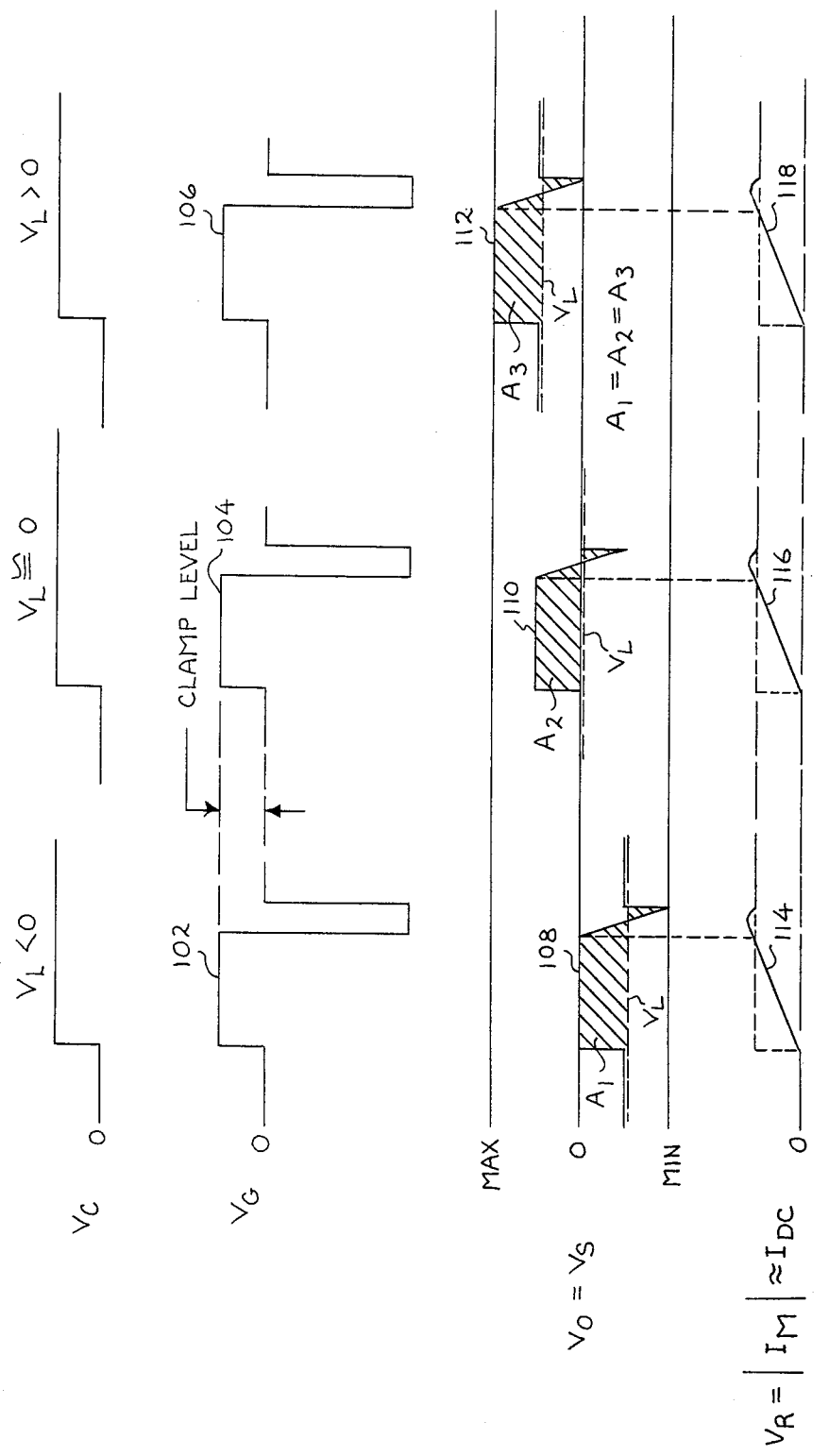

Consider now FIG. 4B which illustrates the effect of clamping the error signal $V_G$ to a fixed magnitude in the positive direction in the same idealized system as in FIG. 4A as evidenced by the waveforms 72, 74 and 76, the clamping of the voltage $V_G$ has the effect of limiting the positive excursion of $V_O$, thus forcing the waveforms 78, 80 and 82 to be substantially identical irrespective of the magnitude of the load voltage $V_L$. The times $t_1'$, $t_2'$ and $t_3'$ are substantially equal, indicating that the time response for a change in current command effected by the signal $V_C$ is invariant with respect to the load voltage $V_L$. FIGS. 4C and 4D illustrate the effect of the subject invention in a realistic system in which the converter 12 has the dynamic characteristics illustrated in FIGS. 2 and 3. These characteristics have been modeled as a fixed slew rate for a negative going voltage.

Considering now FIG. 4C, there is shown a set of waveforms corresponding to prior art practice where no limiting of the error signal $V_G$ occurs as evidenced by waveforms 84, 86 and 88. As shown by the $V_R = |I_M| \approx I_{DC}$ waveforms 90, 92, and 84, a current overshoot occurs due to the slew rate limit on the voltage $V_O$. This overshoot is a function of the magnitude of the load voltage $V_L$, being comparatively greater for a load voltage $V_L$ less than zero.

The waveforms of FIG. 4D, which reflect operation of the subject invention, illustrate the effect of the voltage clamp circuit 64 (FIG. 1) in the system, causing equal amplitudes of the $V_G$ signal as evidenced by waveforms 102, 104 and 106, in turn causing substantially equal volt-second waveforms 108, 110 and 112 to be effected. What results is substantially like current transient characteristics as shown by waveforms 114, 116 and 118 for the three magnitudes of load voltage $V_L$. What is achieved by limiting the error voltage to a fixed magnitude in the positive direction is that the time response and current overshoot become substantially invariant with respect to the magnitude of the load voltage $V_L$.

In summary then what has been shown and described is a method and apparatus for controlling DC current in an active load, rapidly and precisely, while exhibiting a response which is substantially symmetrical for both positive and negative command signals as well as a response which is essentially independent of the DC voltage level at the time of the current command. This control has been described relative to an active load comprising an AC motor drive system which includes an error signal clamp circuit in the current control loop which operates to limit upon command the rate of rise of the motor supplied from an AC-DC inverter.

While there has been shown and described what is at present considered to be the preferred embodiment of the present invention, modifications thereto will readily occur to those skilled in the art. It is not desired, therefore, that the invention be limited to the specific arrangement shown and described, but it is intended to cover all such modifications as fall within the true spirit and scope of the invention as defined in the appended claims.

What is claimed is:

1. A system for limiting the change with respect to time, of an electrical current supplied to the input of an active load from the output of a signal controlled variable output power source coupled to a main source of electrical power, comprising the combination of:
   (a) an inductive reactance linking the output of said signal controlled power source to the input of said active load;
   (b) first and second error signal paths respectively adapted to carry first and second error signals;
   (c) circuit means, coupled to said signal controlled power source, including a first summing junction coupled to said first and second error signal paths and being operable to sum said first and second error signals and generate in accordance therewith a control signal which is applied to and operable to control said controlled power source;
   wherein said first error signal path includes,
   (d) circuit means coupled between said first summing junction and a circuit connection common to the inductive reactance and the input of said active load to provide a positive feedback signal to said summing junction corresponding to the signal appearing at the input of said active load, and
wherein said second signal path includes, (e) circuit means for developing a signal corresponding to the actual current supplied to said active load,
(f) means for developing a signal corresponding to a desired current to be supplied to said active load,
(g) a second summing junction coupled to the last two recited circuit means and being operable to provide a difference signal corresponding to the difference between the actual and the desired current supplied to said active load, and
(h) circuit means coupled to said second summing junction and being responsive to said difference signal and operable to generate a clamped output signal, said clamped output signal comprising another feedback signal applied to said first summing junction, said first summing junction combining said feedback signals to generate a composite control signal which is applied to said variable output power source and being operable to limit the rate of change of current supplied to said active load for a change in the signal level of said signal corresponding to a desired current to be supplied to said active load.

2. A power control system coupled to a main source of electrical power, comprising the combination of:
(a) an active load having an input;
(b) a signal controlled variable output power source coupled to said main source of electrical power and having an output coupled to said active load;
(c) an inductance linking the output of said signal controlled power source to the input of said active load;
(d) first and second feedback signal paths adapted to translate coarse and trim feedback signals respectively;
(e) circuit means, coupled to said signal controlled power source, including a signal summing junction coupled to said first and second feedback signal paths and being operable to sum said coarse and trim feedback signals and generate a composite error signal which is applied as a control signal to said signal controlled power source;
said first signal path including,
(f) circuit means coupled between said signal summing junction and a point common to the electrical impedance and the input of said active load to sense the signal voltage level applied to said active load and accordingly develop said coarse feedback signal;
said second signal path including,
(g) circuit means developing a signal corresponding to the actual current supplied to said active load;
(h) circuit means developing a signal corresponding to a desired current to be supplied to said active load;
(i) another signal summing junction coupled to said circuit means developing signals corresponding to said actual and desired currents to be supplied to said active load and developing a difference signal between said actual and said desired current; and
(j) circuit means coupled to said another signal summing junction and being responsive to the amplitude of said difference signal and being operative to provide an output signal clamped at a selected reference signal level, said clamped output signal being applied to said first recited signal summing junction thereby limiting the change with respect to time of the electrical current supplied to said active load.

3. The system as defined by claim 2 wherein said signal controlled variable output power source comprises:
(a) an AC to DC converter, and
(b) a control circuit coupled thereto, said control circuit being coupled to and responsive to said composite signal from said first recited signal summing junction.

4. The system as defined by claim 4 wherein said first feedback signal path circuit means includes a filter.

5. The system as defined by claim 2,
wherein said signal controlled variable output power source comprises:
(a) an AC to DC converter, and
wherein said active load comprises:
(b) a DC to AC inverter circuit coupled to said converter by means of said electrical impedance, and
(c) an AC motor coupled to said inverter, said inverter circuit being operative to provide an electrical motor current of variable magnitude and frequency to said AC motor.

6. The system as defined by claim 5 wherein said DC to AC inverter includes a variable frequency inverter and a control circuit for receiving a command signal which is adapted to effect a desired type of frequency control of said inverter.

7. The system as defined by claim 6 wherein said circuit means developing a signal corresponding to the actual current supplied to said active load comprises circuit means for developing a signal corresponding to the absolute value of the current supplied to said motor from said inverter.

8. The system as defined by claim 7 and additionally including relatively high gain signal amplifier means coupled between said another signal summing junction and said circuit means generating said clamped output signal applied to said first recited signal summing junction in order to provide precise control under steady state conditions.

9. The system as defined by claim 8 wherein said circuit means generating said output signal applied to said first recited signal junction comprises a clamp circuit operable to limit the level of said output signal, having a positive polarity, to a predetermined level.

10. The system as defined by claim 2 wherein said signal controlled variable output power source comprises a thyristor controlled AC to DC converter coupled to a polyphase main source of electrical power.

11. The system as defined by claim 10 wherein said active load comprises:
(a) a thyristor controlled DC to AC inverter providing a polyphase output AC voltage for driving an AC motor, and
(b) a polyphase AC induction motor coupled to said polyphase AC voltage provided by said thyristor controlled inverter.

12. The system as defined by claim 11 and additionally including control circuit means coupled to said DC to AC inverter for the current supplied to said polyphase AC motor.

13. A method for limiting the rate of change, with respect to time, of a load current supplied to an active load from a signal controlled variable output power source and wherein said active load is coupled to the variable output power source by means of an inductive reactance, comprising:
  generating a first positive feedback signal corresponding to the input voltage applied to said active load for providing a coarse control error signal;
  developing a signal corresponding to the actual current supplied to said active load;
  developing a signal corresponding to the desired current to be supplied to said active load;
  combining said last two recited current signals and developing a difference signal;
  clamping the signal level of said difference signal to a predetermined reference level and thereby generating a second feedback signal for providing a trim control error signal;
  combining said first and second feedback signals and providing a composite error signal, and
  applying said composite error signal to said variable output power source for controlling the current supplied to said active load.

14. The method as defined by claim 13,
  wherein said variable output power source comprises a thyristor controlled AC to DC converter,
  wherein said active load comprises an AC motor driven in accordance with the output of a thyristor controlled DC to AC inverter, and
  wherein said step of clamping said difference signal comprises clamping a difference signal having a positive polarity to a predetermined voltage level, thereby limiting the rate of change of current supplied to said motor in the positive direction.

* * * * *